(No Model.)　　　　　　　　　　　　　　　　　　4 Sheets—Sheet 1.
L. H. NASH.
GAS ENGINE.

No. 278,255.　　　　　　　　　　Patented May 22, 1883.

(No Model.) 4 Sheets—Sheet 2.

L. H. NASH.
GAS ENGINE.

No. 278,255. Patented May 22, 1883.

Witnesses:
Edmund Brodhag
Howell Bartle

Inventor:
pro Lewis Hallock Nash
Johnson and Johnson
Att'ys

(No Model.)

L. H. NASH.
GAS ENGINE.

No. 278,255. Patented May 22, 1883.

UNITED STATES PATENT OFFICE.

LEWIS H. NASH, OF BROOKLYN, ASSIGNOR TO THE NATIONAL METER COMPANY, OF NEW YORK, N. Y.

GAS-ENGINE.

SPECIFICATION forming part of Letters Patent No. 278,255, dated May 22, 1883.

Application filed August 23, 1882. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

My invention relates to engines which work upon the principle of the expansive force of gas or liquid fuel ignited within the power-cylinder.

The object of my invention is to adapt this principle for the development of high power in a comparatively light engine, and to secure great efficiency under all conditions of use. To provide against the destructive effects of too great heat of the cylinder, its piston, and rod, provision is made to maintain these parts at a uniform temperature.

My invention comprehends a system or method in which separate and complete working-parts are combined, so as to act in concert to develop power, each complete member operating independently to perform its function without complicating the other members of the system. This system of co-operating separate and distinct members gives the advantage of being able to locate them in the most advantageous position, which is an important matter in distributing the weights in a marine engine, and for which use my system is especially adapted. My system comprehends as co-operating members an engine adapted to work with a supply of compressed air and gas, an independently-operating air-compressor, serving both as a motor for starting the engine and supplying it with compressed air when running, and means for converting the fuel into a decarbonized gas under sufficient pressure to be supplied direct to the engine, and capable of burning without smoke, the several members working independently and combined to produce a motor capable of being always under perfect control, and having capacity to adapt itself to work with economy and efficiency under varying conditions of use. In carrying out this motor system I can use any suitable air-compressor and operate it in any suitable way—that is to say, by steam generated by a boiler-incasement of the working-cylinder, by an independent boiler, or by both combined, or by an independent gas-engine.

The advantages of running the engine by means of an independently-operating air-compressor are, among others, that the engine may be started at any time, and in marine engines, when it is desired to run at a slow speed in shifting the vessel from one position to another—as from an anchor to a dock, or from one dock to another—the air-compressor will be a sufficient motor to drive the engine without bringing into action the gas-generator for the working-cylinder. It also serves as a starting power while preparing to operate the power-cylinder with gaseous fuel, and in this particular my engine system can be used advantageously for various purposes, such as starting and operating elevators, pumping-engines, and the like.

The method effected by my system of co-operating members is the compression of air by means of a motor operating independently of the engine, conducting the air so compressed to the working-cylinder for operating the same for a given time, and continuing such operation by admitting a combustible mixture into the cylinder with compressed air. In such method the liquid fuel is conducted with steam into a fuel-converter, and the gas thus produced is mixed with a portion of the compressed air, which absorbs the products, producing a mixture which will burn without smoke, and which is admitted to the engine-cylinder in quantities regulated by a governor which controls the supply of combustible gas and and air separately or together, the combustible gas being formed under pressure and so conducted to the power-cylinder, thus avoiding the necessity of compressing the gas after its production.

I have illustrated in the accompanying drawings the independently-operating members of my gas-engine system grouped together for joint operation, in which—

Figure 1, Sheet 1, represents in longitudinal section the power-cylinder with a boiler-incasement; Fig. 2, the fuel-converter, of which two forms are shown in longitudinal section, both producing decarbonized gas from different kinds of fuel; Fig. 3, an elevation of the air-compressor, and Fig. 4 the independent boiler for starting the air-compressor.

The working-cylinder B (shown in Fig. 1) is constructed with a boiler-incasement, A, for generating steam as a power independent of the engine; but as such matter is made the subject of a separate and distinct application for a patent by me, it is deemed unnecessary to particularly describe such invention herein, further than to say that the steam is generated in the incasement by the waste heat of the gases rejected by the engine and accumulates within a steam-dome, A', from which it is used as may be required, and that such boiler-incasement serves to maintain a uniform temperature of the cylinder. The engine is provided with any suitable valve-movement, and its boiler-incasement with suitable boiler attachments, which it is deemed unnecessary to show or describe.

Figure 5:
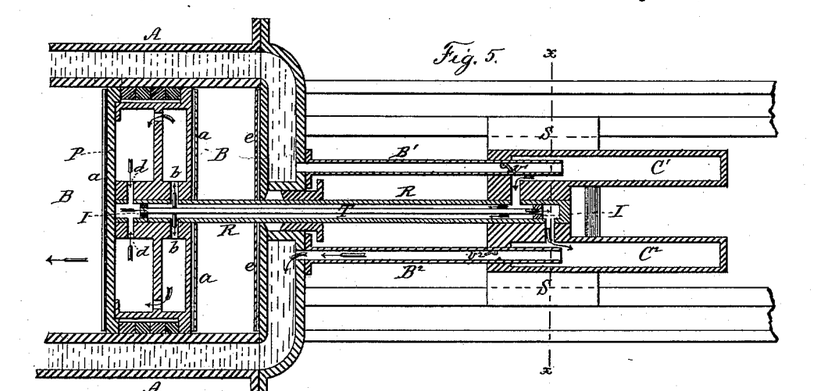
Fig. 5, Sheet 2, a longitudinal sectional view, showing the method of cooling the power-cylinder, its piston, and rod.

In connection with maintaining the cylinder B of a gas-engine at a uniform temperature, I provide means for also maintaining its piston and piston-rod at the same temperature by a water-circulation. I obtain such water-circulation in the piston and its rod by hollow plungers B' B² working into plunger-chambers C' C², and communicating with the hollow piston P by means of its hollow rod R, and its cross-head S, as shown in Fig. 5. As shown in this figure, the hollow plungers B' B² are supported by the cylinder-incasement and open into the plunger-chambers, and the latter, which are carried by the cross-head S, communicate by suitable passages with the chamber of the piston-rod. These hollow plungers are arranged on each side of the piston-rod, and communicate with the water-space of the cylinder-incasement. The plunger B' has a check-valve, $v'$, arranged to open outward from the cylinder, while the plunger B² has a check-valve, $v²$, arranged to open inward toward the cylinder. The piston P moving in the direction of the arrow 1, the chambers C' C² are forced over the plungers, closing valve $v'$, so that the water escapes out of the plunger-chamber C', which opens into the piston-rod chamber, as shown by the arrows, and, passing through the piston-rod into the piston by the holes $b$ $b$, passes through the holes $d$ $d$ of the piston, and returns to the cross-head passage by means of a tube, T, centrally placed within the piston-rod, from which tube it escapes into the plunger-chamber C², which communicates with said tube. From thence the circulation is through the plunger B² back into the cylinder-incasement, the valves $v'$ and $v²$ controlling such circulation. Upon the return-stroke of the piston the valve $v²$ closes and the valve $v'$ opens, producing the circulation in the same direction, constituting a double-acting plunger-pump, taking the water from and returning it to the cylinder-incasement.

The centrally-arranged pipe T within the piston-rod is supported at each end by collars l l, which, with the tube, divide the inflowing from the outflowing water. In such division the plunger-chamber C' communicates with the chamber of the piston-rod by a lateral passage in the cross-head, and the plunger-chamber C² communicates with the central tube, T, by a lateral passage in the cross-head, while the hollow piston is formed with a central hub and a plate, so as to divide it into receiving and outflowing chambers on each side of the hub, the former opening into the piston-rod chamber and the latter into the central tube by lateral passages in the piston-hub.

Figure 6:
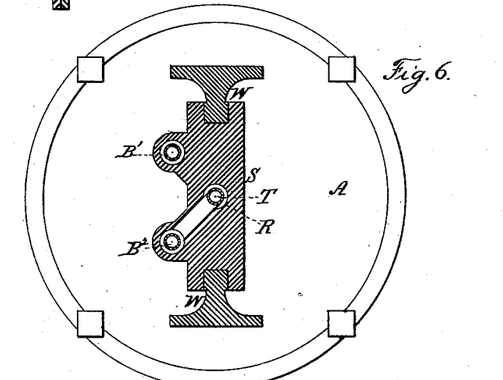
Fig. 6, a cross-section on the line $x$ $x$ of Fig. 5.
Figure 7:
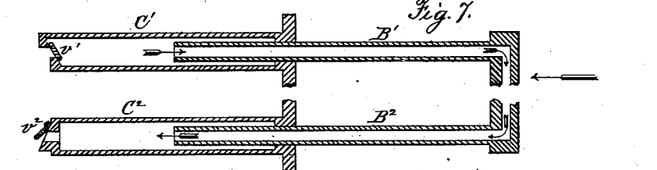
Figs. 7 and 8 show detail modifications of the water-conducting plungers of the piston-rod of the working-cylinder.
Figure 8:
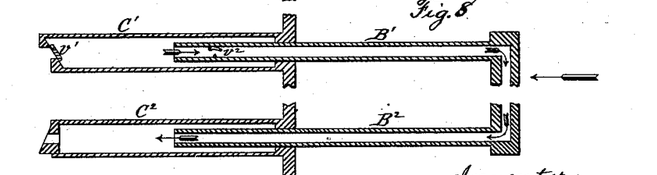

I have shown in Figs. 5 and 6 the plungers B' and B² as being attached to the engine-incasement A, and the plunger-chambers C' and C² as being secured to the cross-head S; but such construction might be reversed, as shown in Figs. 7 and 8. In the modification shown in Fig. 7 the plunger-chambers are arranged to extend within the water-space of the cylinder-incasement, and the valves must be placed upon these chambers, and the pump is double-acting, as in the construction shown in Fig. 5. In the arrangement of the valves shown in Fig. 8 the operation is single-acting, in which B² becomes a carrier-pipe to convey the water from the cross-head to the cylinder-casing.

The exact position and construction of the valves are not important, provided they act together to force the current of water, as shown by the arrows.

The engine works on the principle of receiving a mixture of air and combustible within its cylinder through a portion of its stroke and igniting it therein, driving the piston by expansive force.

Any suitable valve system may be provided for admitting the combustible fuel.

To protect the piston and the cylinder-heads from the direct contact of the hot gases in the cylinder, I cover the piston-faces and the inner sides of the cylinder-heads with thin plates $a$ $a$ $e$, of sheet metal. These plates, becoming rapidly heated by contact with the charge, present a hot surface to the gases, and thus prevent absorption of heat from the charge.

The combustible fuel must be admitted to the engine in a gaseous state, and I provide means for effecting its decarbonization before its entrance into the cylinder, so that it will burn clean, with a smokeless flame, without explosion, and produce little or no deposit of solid matter within the cylinder. In such preparation the gas may be produced from solid or liquid fuel, will contain a comparatively small amount of carbon, and is introduced into the power-cylinder direct from the converter. In such engines as now used a residuum of carbonaceous matter is left in the cylinder after explosion from each charge, and retains its high temperature, rendering it liable by a spark to ignite the incoming charge, prematurely. By my method of preparing the gas all the constituents of the fuel which will not evaporate or reduce are left in the converter and can be removed, so that the fuel leaving the converter will be in condition to ignite readily and burn with a non-luminous and smokeless flame and without leaving a deposit of matter in the communicating passages or pipes. This previous preparation of the fuel is effected under a sufficient pressure to cause it to enter the engine, and in this particular I effect an important advantage in dispensing with the employment of separate compressing mechanism for the gas, or of effecting its compression within the air-compressor or within the power-cylinder by the back-stroke of the piston, as now practiced in explosive engines.

I have shown two forms of converters, one being the equivalent of the other in producing the gas and effecting its decarbonization as a preparatory process. They are both connected with the gas-engine, and can be worked together; but their use is more particularly to meet a contingency of using liquid fuel or solid fuel when one or the other kind of fuel is not obtainable—as for marine engines—and for cleaning out the converter so that there must be no interruption in the production of gas.

Figures 1, 2, 3, 4:
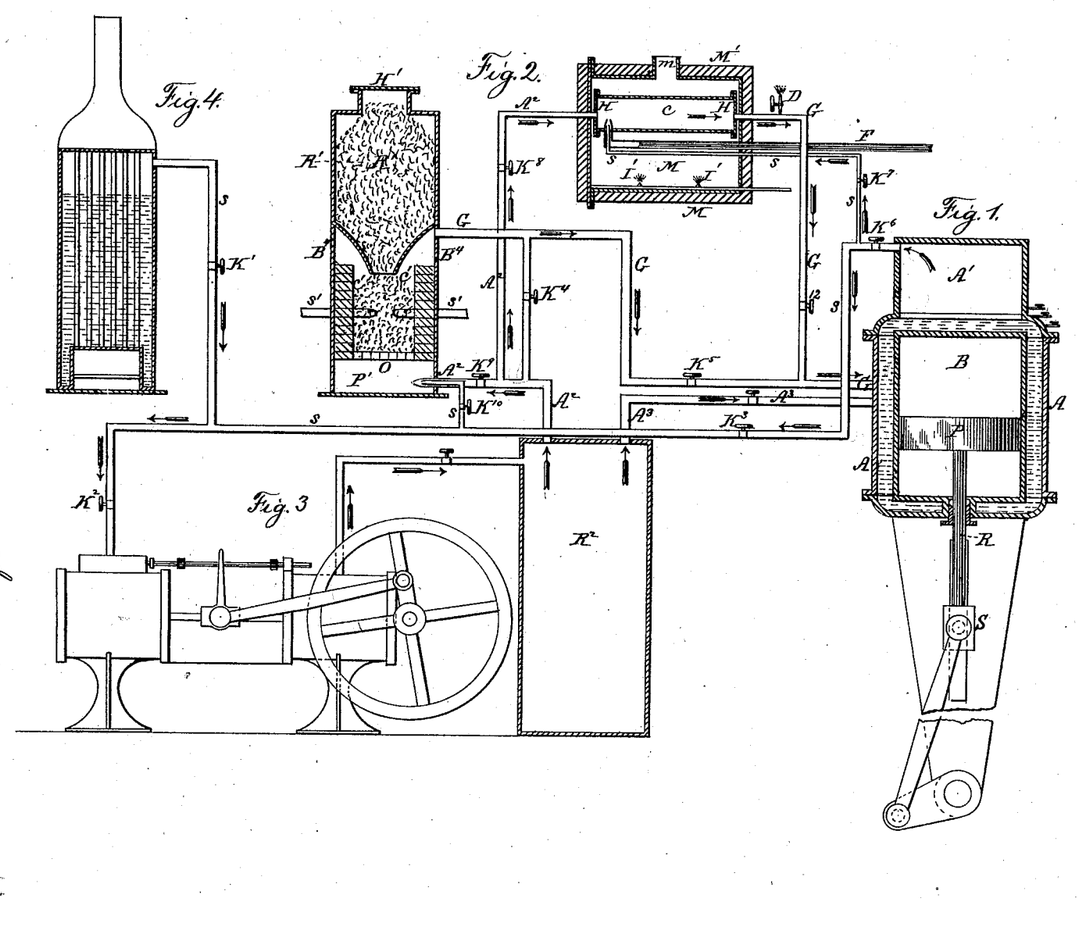

The converter may be adapted for the production of gas from coal and other solid or carbonaceous fuel, or from highly carbonaceous liquid fuel—as crude petroleum—or from the light and more volatile oils, each converting the combustible into a gaseous state before allowing it to enter the engine and to form such a gaseous mixture that it will burn readily without smoke. A good converter for liquid fuel is shown in Fig. 2, and consists of an air-tight heated mixing-cylinder, c, capable of sustaining the pressure of the gases; a heated pipe, F, or a system of pipes connecting the oil-reservoir with the mixing-cylinder and supplying oil thereto under pressure sufficient to cause it to enter said mixing-tube; a heated pipe, s, or system of pipes connecting the mixing-cylinder c with a steam-chamber, so that the steam is brought into contact with the fuel issuing from the pipe F mixed thoroughly while highly heated, and completing such admixture in the converter-chamber by a chemical union of the steam and the hydrocarbon; an external fire of gas-jets, I' I', or other fuel for heating the three members just described, and an air-pipe, $A^2$, connecting the mixing-cylinder with the air-compressor, so as to admit a sufficient amount of air under compression to introduce the fuel from the converter into the working-cylinder under pressure. The admission of the air into the converter-chamber is at a point where the temperature of the gases is low enough to allow the air to mix without ignition of the gases for the purpose of further reducing and absorbing the gases and vapors, while serving the purpose of a vehicle to carry the gases under pressure into the working-cylinder.

The oil and the steam pipes are so arranged to enter the cylinder that the steam-pipe will act as an ejector and send out the hot liquid fuel in the form of jets or spray into the heated and compressed air within the mixing-cylinder. The air, thus becoming saturated with the vapor of the fuel, passes off through the pipe G to the engine as required. A gas-burner, D, is placed upon this supply-pipe G as a means of testing the quality of gas being produced, the supply of air being regulated so that this flame burns without smoke, to determine the proper quantity of air to be admitted to the converter.

The heads H H of the mixing-cylinder are made removable to allow for cleaning out any accumulation of matter which may be deposited within the converter-chamber.

The converter is inclosed within a heating-chamber, M, having a top opening, m, for air for the gas jets, surrounded with non-conducting material, M', to prevent loss of heat, which is supplied by the gas-jets I' I' to the converter.

The heating gas-jets I' I' may be supplied from the engine-connecting pipe G, or from any other source.

The fuel and the steam enter the mixing or converter chamber together in a highly-heated condition, the steam taking up some of the carbon of the fuel and producing a mixture containing carbonic oxide, carbonic acid, hydrogen, and some of the lower hydrocarbon gases and vapors of the oil. The intermingling of air with this mixture absorbs the gaseous vapors which might condense in the engine and passages, and thus forms gaseous fuel, which will be consumed without depositing matter in the working-cylinder and the communicating pipes. As the steam is only required to take up the bulk of carbon from the fuel, it is important to use only sufficient steam for this purpose, and then add enough air to continue the absorption and produce the non-luminous flame required.

Gas-engines as now constructed admit a mixture of air and gas into a cylinder, and then compress them to the required degree, whereas in my method the air only is compressed and the gas is formed in the converter under a sufficient pressure to be used directly, thus avoiding the danger arising from the explosion of a reservoir containing a mixture of air and combustibles under high pressure. The same results are produced by the solid fuel-converter shown, which consists of a magazine, R', for containing coal which supplies the lined combustion-chamber c' c', which, with the magazine, is inclosed within an air-tight case, B⁴, having a grate, O, and ash-pit P' at the bottom, and provided at the top with an air-tight cover, H', for the magazine and an air-tight door for the ash-pit. The air-pipe A² and the steam-pipe s enter the ash-pit, and the gas-pipe G connects with the air-tight case at the top of the combustion-chamber. The fuel being started, the air is admitted, and as soon as the fire is hot enough steam is admitted, admixing with the air, but not in sufficient quantity to lower the temperature of the fuel, serving only to decarbonize the resultant products of the combustion under pressure sufficient to cause them to be supplied directly to the engine or collected in a reservoir for that purpose.

I prefer to use two or more converters in my system, so that one of them can be filled and the accumulation of ashes removed while the other converter is supplying gas. Steam may also be admitted in the combustion-chamber by pipes s' s', extending into the center and hottest part of the solid fuel.

Both the converters which I have described are shown in connection with the engine and the air-compressor, and with the steam-boiler incasement of the engine, and with an independent steam-boiler, so that the steam for the converters can be used from either.

The air-compressor shown in Fig. 3 may be of any approved construction, and is shown as receiving steam from two sources to operate it, one being the boiler-incasement of the engine for continuing to run the air-compressor after it has been once started, and the other being an independent boiler or boilers, (shown in Fig. 4,) used for starting the compressor, so that the compressor is driven by a primary and a secondary steam-boiler, the former of which must be provided as the starting-power.

As a separate and independent source of power, the air-compressor may be run by a gas-engine using gaseous fuel from the same source as the boiler-incased engine, and in such case it becomes the starting-power for the air-compressor. The compressed air is received into a reservoir, R², which connects by the pipes A³ with the power-cylinder; but the compressor may be of such construction as to render a reservoir unnecessary—that is to say, when the compressor is capable of maintaining a constant pressure of air, then a reservoir is unnecessary.

I have shown a vertical boiler as the primary or starting power for driving the air-compressor; but any form of boiler may be used, and my system contemplates the use of the auxiliary boiler-power of the vessel—as, for instance, that required to run the bilge-pumps, donkey-engines, steering apparatus, &c. With such independent source of power for operating the air-compressor, the engine may be run by compressed air while the system is being got under way to run the engine with gaseous fuel.

The converters are shown as receiving steam from either generator and air from the compressor; but separate sources of steam and air may be used, if desired.

Figures 9, 10, 11, 12, 13:
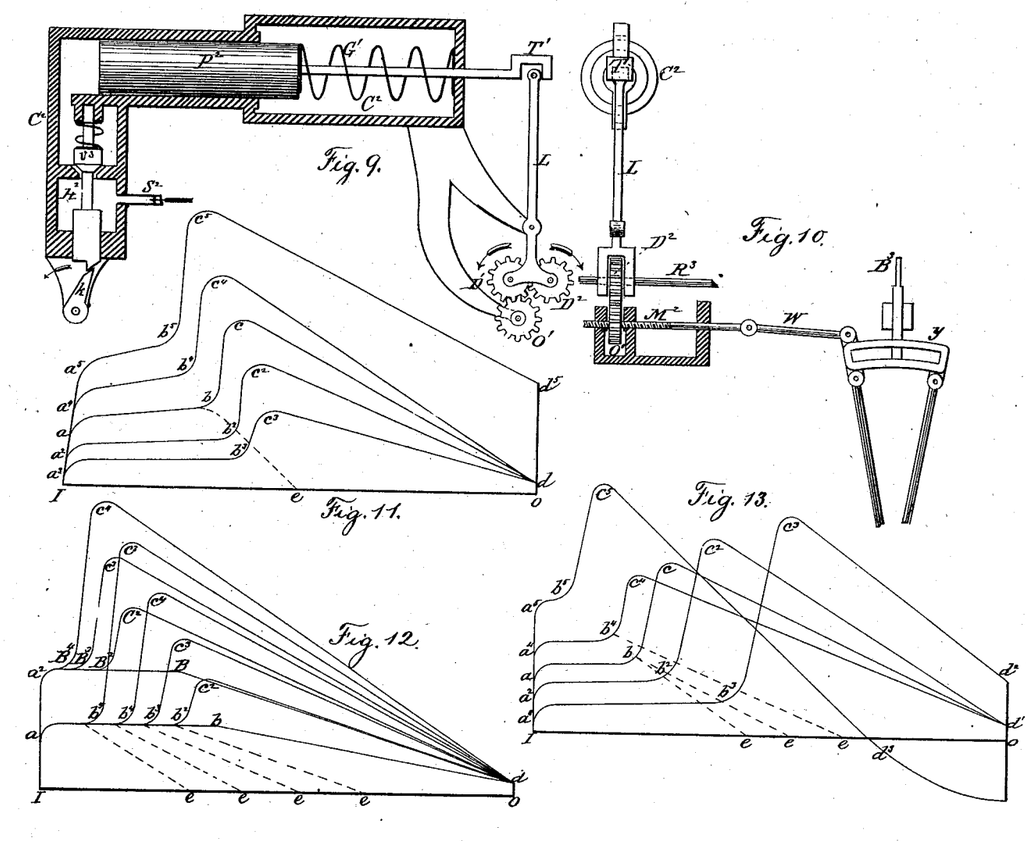
Fig. 9, a longitudinal sectional view of the governor for controlling the cut-off.
Fig. 10, an end elevation of the governor-connections with the link-motion for operating the engine-valve.
Figs. 11, 12, and 13 show a series of cards illustrating the working of the system under different conditions, and showing how the points of cut-off of the engine are regulated by the governor.

As before stated, I provide a governor which shall so control the point of cut-off of the admission of the gases to the power-cylinder that the engine shall always be working at its greatest efficiency. The governor is controlled in its action by the final pressure in the power-cylinder at the end of the stroke. It can be adjusted to respond to any desired pressure, or it can be so adjusted as to indicate the pressure at any instant of the stroke, and when it is so adjusted it will so regulate the point of cut-off that the pressure at the point of the stroke indicated by the governor shall be always the same whatever be the amount of compression of the gases or the quantity of fuel used. The governor will also perform the office of a gage to indicate the pressure at this point in the stroke. The governor shown in Fig. 9 is adapted to record the pressure from one end of the power-cylinder only; but it may be made to record the pressure from both ends by providing a valve for each end of the cylinder.

The governor consists of a device that receives and is controlled by the action of the gases in the engine and a connecting device by which this action is communicated to the valve system of the engine.

The first device or part consists of a cylinder, C², having a plunger, P², fitting it steam-tight, but free to move as acted upon by the pressure of the gases in the engine, which is communicated to it from the valve-chamber H² of the plunger-cylinder whenever the valve v³ is lifted. The valve-chamber H² communicates by a pipe, S², with the engine-cylinder, and the valve is preferably arranged in a part of the cylinder-chamber at right angles to the plunger. This valve is operated by a cam, k, secured upon a shaft driven by the engine, and its motion is such that it lifts the valve v³ at a given instant of the piston-stroke, closing it again quickly. The pressure of the gases when admitted behind the plunger P² drives it forward against a spring, G', which is thereby compressed in proportion to the pressure upon it, and this movement of the plunger is used to regulate the cut-off of the engine.

The second part or device of the governor consists of means by which it is connected to the well-known link-motion. The stem of the plunger carries a clutch, T', which engages with one end of a lever, L, which carries at its other end two spur-pinions, D' D², which are driven by the engine, by any convenient connection, through the shaft R³, so as to be revolved in opposite directions, as shown by the arrows. They are arranged to drive another spur-pinion, O', when brought into gear with it by the rocking movement of the lever. This pinion O' has a nut running on a screw-rod, M², and when it is turned it moves the screw-rod forward or backward, according to the direction of the rotation of the nut. This screw-rod is connected by the rod W to the link y, thus moving the link according as the screw is moved, and regulating the cut-off of the engine-valve, with which the link y is connected by the stem B³, as shown in Fig. 10.

When the pressure in the engine is not as great as desired, the pressure in the plunger-chamber does not force the plunger out, and the clutch T' pulls the lever L, so that the pinion D' engages the pinion o', which therefore begins to move the link to allow the gases to follow farther in the stroke; but when the pressure in the plunger-chamber becomes too great the lever L is moved over so as to engage the pinion D², thus reversing the motion of the pinion o', and thereby the link is adjusted to cut off shorter.

The pressure at which the governor is required to act may be adjusted by varying the tension of the spring G', and the point in the stroke which it is desired to indicate may be determined by connecting the cam k with the engine, so that it will lift the valve v³ at the required portion of the stroke.

The mechanical connections for controlling the cut-off may be varied; and any suitable valve may be used with suitable operating-connections with a plunger, combined with an independent valve controlled by the engine, so as to open and close quickly, letting in the pressure of the gas for an instant.

I have described in general the particular office of each member of the system, and will now describe the operation of the system as illustrated in the drawings, Sheet 1, in connection with the cards illustrating the action of the governor in controlling the cut-off of the valve.

The engine system being started and in running order, the independent steam-generator need not be used; but steam from the engine-boiler incasement is used to drive the compressor. In this system the compressor is designed to use all the steam generated in the engine-boiler incasement, and its speed and the pressure of the air in the reservoir will depend upon the amount of steam generated in such boiler-incasement. In adapting an air-compressor to this system I provide it with the governors now in use, so that it will run whenever there is a pressure of steam in the engine-boiler incasement. Fuel being supplied to the engine through the pipe G and air through the pipe A², the valve system of the engine regulates its supply according to the demand required by the power developed by the engine. Now, of the heat developed by the combustion of the fuel within the engine, a certain portion is utilized in producing power in the engine. The other portion is taken up by the boiler-incasement and develops steam therein. Experiments with gas-engines have shown that when running under the most favorable conditions the quantity of heat utilized to produce power in the engine is about twenty per cent. and the waste heat about eighty per cent. When the compression is less, the quantity of heat utilized is less, while the waste heat is correspondingly greater. The above facts determine the action of my system and its power to adapt itself to the most favorable conditions for the utilization of the fuel used. Let the system be running uniformly under a steady supply of fuel, then a certain portion will be utilized in the engine, and the remainder of the heat will develop steam in the boiler-incasement and be utilized in the compressor in compressing air in the reservoir. Now, let it be required to increase the power of the system, and for this purpose let more fuel be supplied. Under this increase there will be a greater amount of heat generated in the engine, and the quantity of waste heat given into the boiler-incasement will be correspondingly greater; hence the compressor will compress the air in the reservoir to a greater extent, and the engine will therefore be working under greater compression and will utilize more heat. When the generation of the steam in the incasement becomes constant, the amount of compression of air will be constant, and the system will have thus adapted itself to the new conditions.

The power of the system is reduced by decreasing the supply of fuel, which will lessen the heat generated in the engine, and less steam will be supplied to the compressor, so that the amount of compression of air in the reservoir will be less, the engine will be running under less compression, and thus have adapted itself to the new conditions.

The power of the engine is illustrated as being controlled by the amount of fuel supplied by the cards shown in Fig. 11, the point of cut-off being regulated by the governor. The straight portion of the line of pressure $a\ b$ shows the portion of the stroke when the charge is being admitted. $b\ c$ represent the rise of pressure produced by the combustion of the fuel, and $c\ d$ represent the fall of pressure while the charge is expanding, $d$ being the point of the stroke at which the governor is set. The area of this card $I\ a\ b\ c\ d\ o$ represents the total work of the gases in the cylinder of which the portion $I\ a\ b\ e$ is the work of the air-compressor. The similar cards, $I\ a\ b\ c\ d\ o$, &c., show cards where the supply of fuel is less.

It will be seen that the compression of air is less as shown by $I\ a^2$; that it is allowed to follow in the stroke as shown by $a^2\ b^2$; that the pressure due the combustion of the fuel is less as shown by $b^2\ c^2$, and that the expansion-lines pass through the point $d$, the point of cut-off being regulated and determined by the governor. These cards represent the condition wherein the supply of fuel is varied, the point of cut-off being fixed by the governor, the amount of compression being determined by the steam generated in the boiler-incasement. The line I $a^5$ $b^5$ $c^5$ $d^5$ $o$ represents a card taken when the governor has been set at a higher pressure, and shows the conditions when the engine is driven to its full capacity, the gases being discharged from the cylinder at a pressure $o$ $d^5$. From this system of cards it will be seen that the more work done in the engine-cylinder the more steam will be generated in the boiler-incasement, and hence the higher will be the compression of the charge, which are conditions favorable to the economy of the system. While the boiler-incasement can be relied upon to drive the compressor, as stated, yet there are various uses to which the system can be applied where it is desirable to have the air-compressor operated by an independent source of power by which the degree of compression can be maintained at any desired point. Figs. 12 and 13 illustrate two series of cards taken under these changed conditions of constant compression, in which the compressor is run by a separate boiler-power, or by a gas-engine, so that the compression of air in the reservoir may be maintained constant, as contradistinguished from compression depending upon the power developed by the engine.

In Fig. 12, I $a$ illustrate the compression of the entering gases. The lines $b^3$ $c^3$, &c., show the increase of temperature and pressure due the combustion of the fuel, and the points $b'$ $b^2$, &c., are the points of cut-off as determined by the governor when it is required to have the gases expand down to point $d$. The card I $a$ $b$ $d$ $o$ shows when no fuel is supplied to the engine. The card I $a$ $b^2$ $c^2$ $d$ $o$ shows when a small amount of fuel is supplied. $b^2$ $c^2$ show the rise of pressure due this combustion, and the similar cards show cases where the amount of fuel is greater and the rise of pressure due the combustion of the fuel is greater—as, for instance, $b^4$ $c^4$. The cards I $a^2$ $B^2$ $C^2$ $d$ $o$, &c., represent a similar series of cards taken when the compression of the charge is greater, as shown by I $a^2$. It will be seen that in every two such series of cards there will always be two cards of equal area—as I $a^2$ $B^2$ $C^2$ $d$ $o$ and I $a$ $b^4$ $c^4$ $d$ $o$—and for a series having any other initial pressure there will be another card of equal area. This shows that the engine may be made to develop a given amount of power under various different conditions of compression of the charge.

Fig. 13 shows a series of cards of equal area, representing different conditions of supply of fuel, compression of the charge, and point of cut-off; but although these cards represent equal powers developed by the engine, they do not represent the expenditure of the same amount of fuel in each case. On the contrary, there would be a very great difference in the amount of fuel used. Card I $a^5$ $b^5$ $c^5$ $d^3$ $o$ represents when the initial pressure is very high, the amount of fuel very small, and the point of cut-off early in the stroke, so that the pressure falls rapidly by expansion and sinks below the atmospheric pressure-line I $o$ before the completion of the stroke, as shown by the line $c^5$ $d^3$ $o$. Card I $a$ $b$ $c$ $d'$ $o$ shows a small compression following far in the stroke and a high degree of expansion due to the combustion of the fuel, as at $b^3$ $c^3$, the gases being discharged under high pressure, as at $o$ $d^2$. Between these extremes are a series of cards corresponding to each degree of compression, and somewhere within the limits will be a card which will use the minimum amount of fuel, considering the fuel used in both air-compressor and engine. This card will be determined by actual experiment for each condition in particular, so that the best point of cut-off, degree of compression, and amount of fuel supplied will be known for each engine system which will be the most efficient to develop the desired amount of power, and the engine can be run in accordance with the best conditions.

These figures are not accurate representations of actual cards made by the pressure of the governor on a paper roll, but designed to exaggerate and show the various features which effect the power of the system and the effect of the various parts of the system in controlling the result desired. It is this adjustability of this engine system to meet the various conditions of varying power required in practice that constitutes one of its valuable features.

In driving the engine by the compressor operated by the independent boiler the speed will be slow and there will be no more expenditure of fuel than is required by the independent boiler, while the engine will be in readiness to develop power whenever it is required to do so by admitting a charge of the combustible mixture within the cylinder and igniting the same by an electric spark or other approved means. In starting, the independent boiler drives the compressor, compressing the air in the reservoir to a degree sufficient to drive the piston through a portion of its stroke, and then, the inlet being cut-off by expansion through the remainder of the stroke, the same being repeated upon the return-stroke. The engine being in motion, a small quantity of fuel is admitted with air and ignited. As the engine warms up the point of cut off of the admission of the compressed air is gradually changed by the valve-connecting mechanism. As the supply of fuel is increased the admission of air is cut-off shorter, so as to keep the pressure of the waste gases at the end of the stroke at about the pressure of the atmosphere. This adjustment of the valve is continued until the engine is at the temperature at which it will remain while running.

The engine now running in order, there are three elements which act together to determine the speed and power developed by the engine, and the engineer has them each at his control to adjust each and all of them at his pleasure.

These elements or factors are, the degree of compression of the air in the reservoir, the quantity of fuel supplied to the engine, and the point of cut-off of the admission of the air to the engine. In general, the first two factors should determine the third, and the point of cut-off, as stated before, should be so adjusted that when the gases have expanded throughout the stroke they shall have just pressure enough to escape from the engine. The method by which this final pressure is indicated to the engineer has been described.

The pressure of the air in the reservoir can always be kept at the point desired, whatever be the speed of the engine or the power developed, since the air-compressor runs independently of the engine, and is separately under the control of the engineer. The degree of compression to be used in any given case having been determined by the engineer, the supply of fuel and the point of cut-off may be mutually adjusted so as to give the best results for any given case, the object being to use the least possible amount of fuel to develop a given amount of power, and by looking at the power-indicator the engineer can determine how much power the engine is developing. For every given amount of fuel being supplied to the engine at any given time there will be a corresponding point of cut-off where the engine will develop the greatest power. The position of this point of cut-off will be determined by the following conditions: If there were no heat given up by the gases to the engine-walls, the most efficient point of cut-off would be early in the stroke, when the temperature of the gaseous products at the instant of ignition should be the highest possible, and could not be allowed to expand the most; but since the gases rapidly lose their heat by conduction, the best point of cut-off in practice will be later in the stroke, and the engineer will adjust the point of cut-off by the valve-gearing of the engine, in view of the power-indicator, until the engine is developing its greatest amount of power possible under those conditions. The higher the pressure of the entering air the more efficient will the engine be when running with full power. When running light the pressure should be adjusted to that point which shall be found in practice to be most efficient.

It will thus be seen that by my combined system I am enabled to adapt my engine to any of the various conditions under which the engine is required to run, and to adapt it so that it shall always work under the most favorable conditions as to efficiency, the whole being always under the control of the engineer.

To operate the system by the air-compressor, steam is made in the independent boiler, Fig. 4, and the cocks K′ and K² are opened, while cock K⁶ remains closed. Steam is admitted through cocks K′ and K², driving the air-compressor, compressing the air in the reservoir. The liquid-fuel converter can now be operated, receiving steam through cock K⁷ and air through cock K⁸. If using solid fuel, the converter receives its steam through cock K¹⁰ and its air through cock K⁹. As soon as the converters, either separately or together, begin to develop the fuel-gas, it is admitted to the engine, together with a charge of air from the reservoir, and the engine begins to develop power, and steam will be formed within its boiler-incasement. When the steam is under sufficient pressure in the boiler-incasement the cock K⁶ is opened and the steam therefrom will assist in driving the compressor. As soon as the steam in the boiler-incasement is generated fast enough the cock K′ is shut off and the fire allowed to go out in the independent boiler.

The compressor is now driven by steam from the engine-boiler incasement. The compressor may be run and receive its source of power from a gas-engine, and be capable of maintaining the pressure of the air in the reservoir at any desired point, in which case the temperature of the engine, its piston, and rod may be kept from being unduly heated by a circulation of cold water.

This patent is intended to cover only the improvements which are made the subject of the respective claims. Other improvements herein shown and described—such as the gas producer and converter and the method of admitting the gaseous fuel into the working-cylinder, so that it will burn without explosion—will be made the subject of other applications for patents. These separate patents will embrace, among other things, provision for admitting the gas and compressed air in separate streams into the cylinder in such volume that the gas and air will not mingle, but produce a slow combustion with a non-luminous flame, burning freely, but leaving no deposit of carbon in the cylinder.

I have stated that the degree of compression of the charge, the point of cut-off, and the supply of fuel are each separately under the control of the engineer, and it will be understood that by operating the compressor independently of the engine the amount of compression can be maintained at any point without any change in the point of cut-off or in the quantity of fuel used in the engine; hence the amount of fuel supplied to the engine or the point of cut-off does not affect the degree of compression under which the engine is working, such compression being maintained constant by the independently-working compressor.

In the drawings I have shown the engine with a governor controlling the point of cut-off by means of the valve mechanism.

Figures 14, 15, 16, 17:
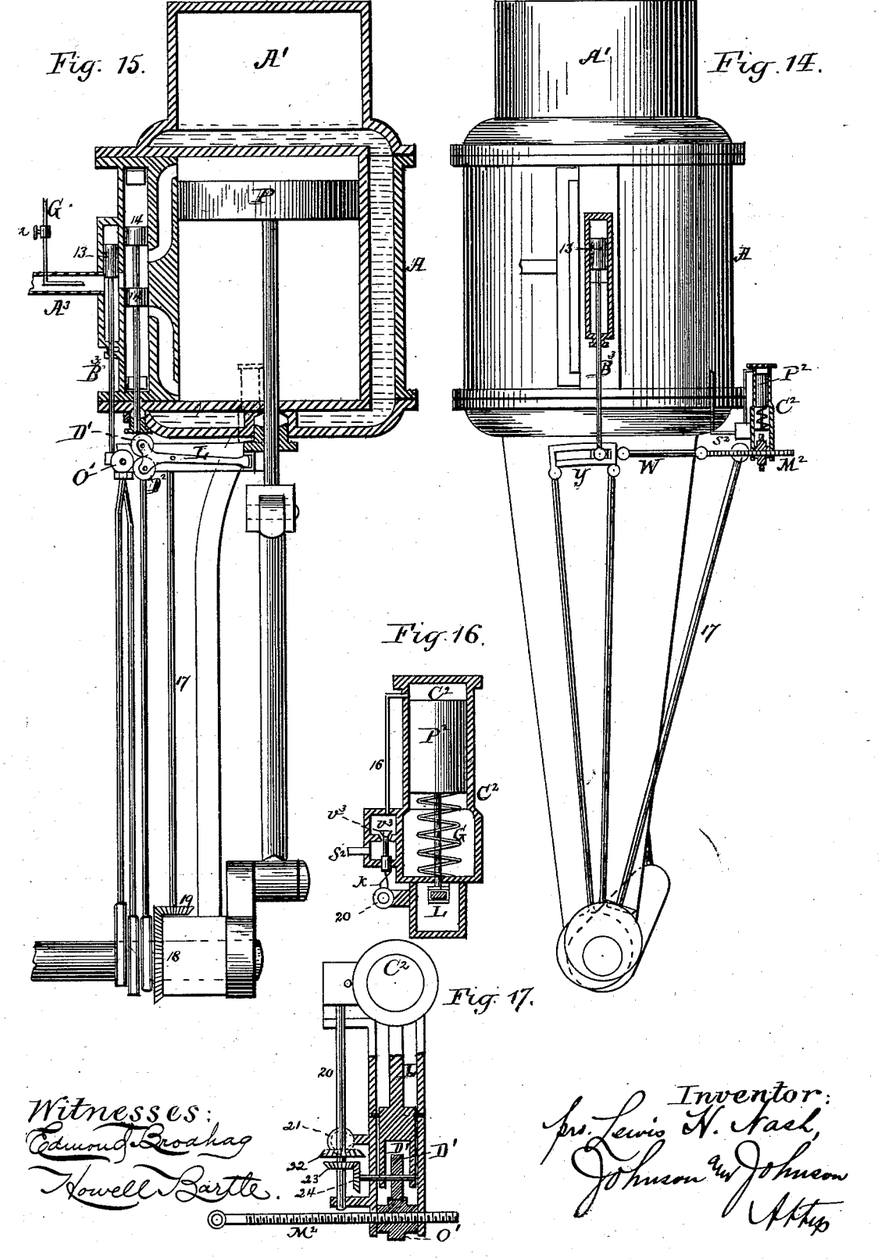
Fig. 14 represents in elevation the engine-boiler incasement and the governor attached thereto.
Fig. 15, a vertical section of the same.
Fig. 16, the governor in longitudinal section.
Fig. 17 shows the operating mechanism of the governor-valve.

The supply of fuel is regulated by the cock 12 in Fig. 15. The fuel from pipe G, entering the pipe A² and mixing with the air, passes into the valve 13, which is operated by the eccentric and link-motion, as in Figs. 16 and 17, and operates as a cut-off in a manner well known. This cut-off valve 13 admits the charge at the proper time through the main valve 14 to the engine-cylinder. The pressure from the cylinder to the valve-chamber $H^2$ of the governor is conveyed by the pipe $s^2$, Fig. 14, which enters the power-cylinder and the said chamber, and from the latter it is admitted by the valve $v^3$, through a pipe, 16, to the plunger-chamber $C^2$.

The governor is shown as attached to the engine, and as being operated by the shaft 17, which is geared to the engine-shaft by gear-wheels 18 and 19, and driving the counter-shaft 20 by gears 21 and 22. The cam or eccentric $k$ is secured on the shaft 20, as shown in Figs. 9 and 17, and it is set so as to operate the valve $v^3$ at the desired instant of the stroke, while the gear-wheels $D'$ and $D^2$ are operated through bevel-gear 23 and 24, which are driven by the shaft 20. The gear-wheel $D'$ and $D^2$ have their bearings in the lever L so placed that they will alternately mesh into and drive the gear $O'$ when the lever L is moved by the governor, as already described.

While I have shown the governor as being attached to the engine and adapted to control a cut-off operated by the well-known link-motion, I do not confine myself to this particular construction, for my governor may be adapted to control any form of cut-off-valve motion by a special adaptation to each particular case. The valve $v^3$ may also be placed at any convenient point upon the pipes which connect the cylinder with the governor-chamber $C^2$. By disconnecting the governor the engineer can adjust the point of cut-off to that point which in his judgment may be most favorable for the operation of the engine at the required power, while the supply of fuel may also be regulated by the cock 12, or by any independent cut-off valve, for in my gas-engine system it is a distinctive feature that the adjustment of the cut-off does not affect the degree of compression of the charge, as this is maintained by the separate compressor. It is this independently-operating air-compressor that gives the engineer power to control the cut-off without at the same time changing the degree of compression. In engines where the air-compressor pump is connected to and driven by the engine itself a certain quantity of air at atmospheric pressure is taken in at the compression-cylinder at each stroke, and it must be compressed to such a degree that it will fill the space occupied by the charge in the power-cylinder. Now, if the cut-off is made shorter, so as to leave less space for the charge, then the air must be compressed more, so as to enter this space in the power-cylinder, and then the charge will be under greater compression; but with the independently-operating compressor the cut-off has no influence upon the degree of compression.

I claim in a gas-engine—

1. The method substantially herein described of operating gas-engines, which consists in compressing air by means of a motor operated independently of the engine, conducting the air so compressed to the working-cylinder for operating the same for a given time, and then continuing the operation of the engine by a combustible mixture and air separately admitted to the power-cylinder.

2. The method substantially herein described of operating gas-engines, which consists in compressing air by a motor independently of the engine, conducting a portion thereof to a converter, where it is mingled with hydrocarbon gas, which is then admitted to the power-cylinder in regulated quantities, together with a regulated supply of compressed air.

3. The method substantially herein described of operating gas-engines, which consists in producing the combustible mixture within a converter under pressure sufficient to drive it into the power-cylinder in regulated quantities, together with a supply of compressed air from a compressor operating independently of the engine.

4. The method substantially herein described of operating gas-engines, which consists in producing the combustible mixture within a converter under pressure sufficient to drive it into the power-cylinder, admitting steam into said converter in sufficient quantity to decarbonize the hydrocarbon, admitting the combustible fuel so prepared to said power-cylinder in connection with air from a compressor operated independently of the engine and controlling and regulating the supply both of fuel and air to the working-cylinder.

5. The method substantially herein described of operating gas-engines, which consists in producing the combustible mixture in a converter by introducing therein heated hydrocarbon oil under pressure in spray or jets intermixed with steam as the decarbonizing and injecting agent, and intermixing with such combustible a sufficient amount of air under compression to serve as the vehicle for driving the fuel from the converter and to aid in absorbing the vapors of the gas, driving such combustible mixture into the power-cylinder by the same pressure which supplies the charge of the combustible mixture with a separate charge of air under compression in the cylinder, and regulating and controlling such supply of combustible and air.

6. The method substantially herein described of operating a gas-engine, which consists in decarbonizing hydrocarbon oil under pressure within a heated converter and supplying said engine with a gaseous fuel so prepared under pressure as to burn with air under compression, without smoke and the deposit of carbon.

7. The combination, in a gas-engine, of an air-compressor, an independent motor for operating it, a converter for producing and preparing the gaseous fuel under pressure, and a power-cylinder adapted to receive the air and combustible in separate charges, with means substantially described for effecting a definite supply of fuel, and by which the degree of compression of the fuel in the cylinder and the point of cut-off may be each regulated independently to secure the greatest economy of fuel.

8. The combination, in a gas-engine, of an air-compressor operated by an independent motor, a gas-producer and converter, a power-cylinder having a boiler-incasement, and a governor for regulating and controlling the supply of combustible and compressed air to the engine, substantially as described, for the purpose specified.

9. The combination, in a gas-engine system, of a compressor operated by an independent motor, a reservoir for the compressed air, a converter for preparing the fuel for use, as described, a power-cylinder separately supplied by fuel and compressed air, with suitable pipe-connections for the compressor, its independent motor, the converter, and the engine provided with cocks arranged to place the control of the several independent factors of the system under the control of the engineer, substantially as herein described.

10. The combination, with the power-cylinder of a gas-engine, of a governor device consisting of an inclosed spring-attached plunger connected by suitable mechanism with the valve system of the engine, and a valve automatically operated by the engine communicating with chamber within which the plunger works and with the chamber of said power-cylinder, whereby to allow an instantaneous pressure from the cylinder to act upon the plunger, for the purpose specified.

11. The combination of the power-cylinder of a gas-engine with a governor attachment, consisting of a plunger, $P^2$, the chamber $C^2$, within which it operates, communicating with the power-cylinder, a bearing and retracting spring, $G'$, for said plunger, a valve, $v^3$, automatically operated by the engine in communication with said plunger, chamber adapted to allow an instantaneous pressure to the plunger from the power-cylinder at a given point of the stroke, and means, substantially such as described, for connecting said governor-plunger with the valve system of the engine, whereby to control the point of cut-off, for the purpose specified.

12. In combination with the power-cylinder of a gas-engine, a governor for regulating the supply of gas and air thereto, consisting of a cylinder, $C^2$, a plunger, $P^2$, having a clutch-connecting stem, a bearing and retracting spring, $G'$, therefor, a valve, $v^3$, arranged within or upon the chamber of the plunger-cylinder, communicating with the chamber of the working-cylinder, the cam $k$, operated by the engine to open said valve, the plunger-clutch connecting-lever L, having the pinions $D'$ and $D^2$, adapted to engage with the pinion $O'$, and means substantially described for connecting the governor-plunger with the link-motion of the engine-valve.

13. The hollow piston-rod having a centrally-arranged tube, T, and end dividing-collars, I I, one arranged within its piston-connecting end and the other within its cross-head-connecting end, in combination with a water-incased cylinder, hollow plungers, and plunger-chambers communicating with the water-space of the cylinder, and valves suitably arranged to effect a flow in one direction through the communicating parts by the pumping action of the piston.

14. The combination, with the water-incased cylinder of a gas-engine, the chambered piston, and its hollow rod, of hollow plungers $B'$ and $B^2$, plunger-chambers $C'$ $C^2$, communicating therewith, a central tube within the piston-rod dividing the water-flow, and valves suitably arranged to produce a water-circulation through the communicating parts by the pumping action of the piston, one of said hollow plungers communicating with a chamber of the piston through the piston-rod, and the other hollow plunger communicating with a separate chamber of the piston through the central tube of the piston-rod.

15. In combination, the water-incased working-cylinder of a gas-engine, a chambered piston, P, having a hollow piston-rod, R, provided with a central dividing-tube, T, the hollow plungers $B'$ $B^2$, fixed to the cylinder-incasement and communicating with its water-space, the plunger-chambers $C'$ $C^2$, carried by the cross-head and communicating with the hollow plungers, the hollow piston-rod, the chambered piston, and the valves $v'$ and $v^2$, arranged within the plungers, all constructed and arranged to produce a water-circulation, for the purpose specified.

16. The power-cylinder of a gas-engine, provided with thin metal plates on the inner sides of its heads, for the purpose specified.

17. The piston of a gas-engine, having its opposite ends provided with thin metal plates, for the purpose specified.

18. The combination, with the power-cylinder of a gas-engine, having the inner sides of its heads provided with thin metal plates, of the piston having its opposite ends provided with thin metal plates, for the purpose specified.

19. In combination, the following instrumentalities, namely: the power-cylinder of a gas-engine, a plunger operating within a chamber in communication with the power-cylinder, a valve communicating with said chamber, automatically operated by the engine to admit an instantaneous pressure from the power-cylinder to the plunger-chamber, a spring for regulating the movements of said plunger, and means, substantially such as described, for connecting said plunger with the valve mechanism of the engine, whereby the plunger is caused to operate said valve mechanism, for the purpose specified.

20. The combination, substantially hereinbefore described, of a gas-engine with an air-compressor and a motor therefor, operating independently of the engine and without regard to the quantity of compressed air consumed thereby, and means substantially herein described whereby the point of cut-off may be independently adjusted to that point in the stroke which will give the greatest economy in the use of the fuel.

In testimony whereof I have hereunto set my hand in the presence of two subscribing witnesses.

LEWIS HALLOCK NASH.

Witnesses:
 A. E. H. JOHNSON,
 J. W. HAMILTON JOHNSON.